United States Patent
Bonnet et al.

(10) Patent No.: US 7,241,817 B2
(45) Date of Patent: Jul. 10, 2007

(54) PROCESS FOR GRAFTING A FLUOROPOLYMER AND MULTILAYER STRUCTURES COMPRISING THIS GRAFTED POLYMER

(75) Inventors: Anthony Bonnet, Beaumont le Roger (FR); Barbara Ramfel, Longpont sur Orge (FR); Fabrice Chopinez, Evreux (FR); Karine Triballier, Saint Eloi de Fourques (FR); Michael Werth, Bernay (FR); Thierry Pascal, Charly (FR)

(73) Assignee: Arkema France, Puteaux (FR)

( * ) Notice: Subject to any disclaimer, the term of this patent is extended or adjusted under 35 U.S.C. 154(b) by 140 days.

(21) Appl. No.: 10/859,300

(22) Filed: Jun. 2, 2004

(65) Prior Publication Data

US 2005/0203203 A1    Sep. 15, 2005

Related U.S. Application Data

(60) Provisional application No. 60/508,964, filed on Oct. 6, 2003.

(30) Foreign Application Priority Data

Jun. 6, 2003  (FR) .................................. 03 06844
Jun. 24, 2003 (FR) .................................. 03 07597

(51) Int. Cl.
   *C08F 2/46*      (2006.01)
(52) U.S. Cl. ...................... 522/156; 522/150; 522/153; 522/155; 522/184; 522/186; 522/187; 522/113; 522/120; 522/123; 522/132; 522/133; 264/464; 264/470; 264/477; 264/478; 264/485; 264/494; 264/176.1; 428/500; 428/510; 428/515; 428/516
(58) Field of Classification Search ................ 522/150, 522/153, 155, 156, 184, 185, 186, 187, 113, 522/114, 120, 121, 123, 132, 133; 264/464, 264/470, 477, 478, 485, 494, 176.1; 428/500, 428/510, 515, 516
See application file for complete search history.

(56) References Cited

U.S. PATENT DOCUMENTS

| | | | |
|---|---|---|---|
| 4,129,617 A * | 12/1978 | Machi et al. ............... | 522/120 |
| 4,151,225 A | 4/1979 | Buning | |
| 4,308,359 A | 12/1981 | Buning | |
| 5,576,106 A * | 11/1996 | Kerbow et al. ............. | 428/403 |
| 5,736,610 A * | 4/1998 | Nishi et al. ................. | 525/276 |
| 5,965,275 A * | 10/1999 | Nishi et al. ............... | 428/475.8 |
| 6,086,907 A | 7/2000 | Goldberg et al. | |
| 6,306,975 B1 * | 10/2001 | Zhao et al. .................. | 525/276 |
| 6,409,867 B1 * | 6/2002 | Kronfli et al. ......... | 156/244.11 |
| 6,524,671 B1 * | 2/2003 | Spohn ....................... | 428/35.7 |
| 6,552,099 B2 * | 4/2003 | Yamamoto et al. ......... | 522/156 |
| 2003/0099799 A1 | 5/2003 | Koike et al. | |
| 2003/0139534 A1 * | 7/2003 | Brothers et al. ......... | 525/326.3 |
| 2005/0049320 A1 * | 3/2005 | Yoshida et al. ............... | 521/27 |
| 2005/0062023 A1 * | 3/2005 | Korzhenko et al. ......... | 252/500 |
| 2005/0092429 A1 * | 5/2005 | Jing et al. ................ | 156/273.3 |

FOREIGN PATENT DOCUMENTS

| | | |
|---|---|---|
| EP | 0214880 B1 | 7/1986 |
| JP | 2000-165300 | 2/2001 |
| WO | WO 00/17889 | 3/2000 |
| WO | WO2006042764 A2 * | 4/2006 |

\* cited by examiner

*Primary Examiner*—Sanza L. McClendon
(74) *Attorney, Agent, or Firm*—Thomas F. Roland

(57) ABSTRACT

The present invention relates to a process for grafting an unsaturated monomer onto a fluoropolymer, having the steps of:

a) melt blending the fluoropolymer with the unsaturated monomer;
b) forming the blend obtained in a) into films, sheets, granules or powder;
c) exposing the products from step b), in the absence of air, to photon (γ) or electron (β) irradiation with a dose of between 1 and 15 Mrad; and
d) optionally treating the product obtained at c) in order to remove all or part of the unsaturated monomer that has not been grafted onto the fluoropolymer.

Structures made with these materials are barriers to many fluids and in particular to petrol and to air-conditioning fluids and may be formed into bottles, tanks, containers, pipes, hoses and vessels of all sorts. They may also be converted into films with which packaging is made.

21 Claims, No Drawings

PROCESS FOR GRAFTING A FLUOROPOLYMER AND MULTILAYER STRUCTURES COMPRISING THIS GRAFTED POLYMER

This application claims benefit, under U.S.C. § 119(a) of French National Applications Number 03.06844, filed Jun. 6, 2003, and 03.07597 filed on Jun. 24, 2003; and also claims benefit, under U.S.C. § 119(e) of U.S. provisional application 60/508,964, filed Oct. 6, 2003.

BACKGROUND OF THE INVENTION

Fluoropolymers, for example those based on vinylidene fluoride $CF_2=CH_2$ (VDF) such as PVDF (polyvinylidene fluoride), are known to offer excellent mechanical stability properties, very great chemical inertness and good ageing resistance. These qualities are exploited for various fields of application. For example, mention may be made of the manufacture of extruded or injection-moulded parts for the chemical engineering industry or for microelectronics, the use in the form of impermeable ducts for transporting gases or hydrocarbons, the production of films or coatings for protection in the architectural field, and the production of protective elements for electrical engineering uses.

However, this chemical inertness of fluoropolymers means that it is difficult to bond them or combine them with other materials. The present invention discloses a process in which a reactive functional group is fixed onto a fluoropolymer. This fluoropolymer thus modified may be easily bonded to or combined with other materials. The process of the invention consists in melt-blending the fluoropolymer with the functional monomer that it is desired to graft onto the said fluoropolymer and then the mixture obtained, being in divided form such as granules, is irradiated in order to graft the functional monomer onto the fluoropolymer.

Patent EP 214880 discloses a process for manufacturing polyvinylidene fluoride copolymers by grafting a monomer onto the polyvinylidene fluoride by means of ionizing radiation, which process comprises the following steps:

a)—immersing a polyvinylidene fluoride powder or film in a solution of a monomer chosen from the group comprising acrylamide, styrene, methylstyrene, allyl glycidyl ether, 2-vinylpyridine, 4-vinylpyridine, 2-methyl-5-vinylpyridine, dimethylaminoethyl acrylate, dimethylaminoethyl methacrylate, dimethylaminopropyl acrylate, dimethylaminopropyl methacrylate, diethylaminoethyl acrylate, diethylaminoethyl methacrylate, diethylaminopropyl acrylate, diethylaminopropyl methacrylate, dimethylaminopropyl methacrylamide, N-vinylpyrrolidone, N-vinylcaprolactam, acyloxy styrenes and hydroxystyrenes, vinyl sulphonic acid and its derivatives, acrylic acid and methacrylic acid, in order to impregnate the polyvinylidene fluoride powder or film with the said monomer;

b)—irradiating the impregnated powder or film by means of ionizing radiation in the absence of oxygen; and c)—then subjecting the grafted copolymer obtained to a chemical reaction in order to confer an ionic character on it when the grafted monomer does not have an ionic character.

Patent Application WO 00/17889 discloses power cable jackets comprising, in succession, a layer formed from an ethylene/alkyl acrylate/maleic anhydride terpolymer and a layer of a VDF/HFP fluorocopolymer. To improve the adhesion of these layers, the assembly is subjected to ionizing radiation.

U.S. Pat. No. 5,576,106 discloses a process for grafting an unsaturated functional monomer onto the surface of a powdered fluoropolymer. Powdered maleic anhydride is blended with the fluoropolymer and then they are put in a polyethylene bag and, after the air contained in the bag has been expelled, the bag containing the powder blend is subjected to radiation of between 3 and 6 Mrad. According to a variant, the maleic anhydride is dissolved in acetone, the solution is mixed with the powdered fluoropolymer and then the acetone is evaporated. The material is then irradiated as above. The grafted fluoropolymer is then used in multilayer structures. In all the examples, only fluoroelastomers are used.

The peel force between a layer of fluoropolymer grafted according to the above prior art and another material is insufficient for many applications, particularly in structures that include polyolefins.

It has now been found that if the fluoropolymer and the functional monomer that it is desired to graft onto the said fluoropolymer are melt blended and then the blend obtained, either in divided form, such as granules, or in film or sheet form, is irradiated, grafting through the mass of the fluoropolymer is obtained. This grafted fluoropolymer used in multilayer structures allows very high peel forces to be obtained.

SUMMARY OF THE INVENTION

The present invention relates to a process for grafting an unsaturated monomer onto a fluoropolymer, in which:

a) the fluoropolymer is melt blended with the unsaturated monomer;

b) the blend obtained in a) is made in the form of films, sheets, granules or powder;

c) the products from step b) are exposed, in the absence of air, to photon ($\gamma$) or electron ($\beta$) irradiation with a dose of between 1 and 15 Mrad; and d) the product obtained at c) is optionally treated in order to remove all or part of the unsaturated monomer that has not been grafted onto the fluoropolymer.

The grafted fluoropolymer obtained can be used as such or as a blend either with the same fluoropolymer but not grafted either with another fluoropolymer either with another polymer such as an acrylic polymer. As examples of acrylic polymer mention may be made of PMMA and impact modifiers such as core-shells.

The invention also relates to structures that include at least one layer of this grafted fluoropolymer and at least one layer of another material.

The invention also relates to the use of these structures for obtaining a barrier effect.

These structures are barriers to many fluids and in particular to petrol and to air-conditioning fluids.

These structures may be formed into bottles, tanks, containers, pipes, hoses and vessels of all sorts. They may also be converted into films with which packaging is made.

The combined use of a fluoropolymer impermeable to apolar fluids and of a polyolefin impermeable to polar fluids is particularly beneficial as it allows a barrier to be obtained that is very effective against petrols containing liquids such as M15 (42.5% isooctane, 42.5% toluene and 15% methanol by volume) or TF1 (45% toluene, 45% isooctane and 10% ethanol).

The invention also relates to structures in which the fluoropolymer is used to protect substrates.

In the above cited structures the grafted fluoropolymer can be used as such or as a blend as cited above.

The invention also relates to the bulk-grafted fluoropolymer. It relates also to the bulk-grafted fluoropolymer as a blend either with the same fluoropolymer but not grafted either with another fluoropolymer either with another polymer such as an acrylic polymer. As examples of acrylic polymer mention may be made of PMMA and impact modifiers such as core-shells.

DETAILED DESCRIPTION OF THE INVENTION

The term fluoropolymer thus denotes any polymer that has in its chain at least one monomer chosen from compounds containing a vinyl group capable of opening in order to be polymerized and that contains, directly attached to this vinyl group, at least one fluorine atom, at least one fluoroalkyl group or at least one fluoroalkoxy group.

As examples of monomers, mention may be made of vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers, such as perfluoro(methyl vinyl) ether (PMVE), perfluoro(ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R_1CH_2OCF=CF_2$ in which $R_1$ is hydrogen or $F(CF_2)_z$ and z is 1, 2, 3 or 4; the product of formula $R_3OCF=CH_2$ in which $R_3$ is $F(CF_2)_z$— and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer; it may also contain non-fluorinated monomers such as ethylene.

For example, the fluoropolymer is chosen from:

Homopolymers and copolymers of vinylidene fluoride (VDF) preferably containing at least 50% by weight of VDF, the copolymer being chosen from chlorotrifluoroethylene (CTFE), hexafluoropropylene (HFP), trifluoroethylene (VF3) and tetrafluoroethylene (TFE);

homopolymers and copolymers of trifluoroethylene (VF3); and copolymers, and especially terpolymers, that combine the residues of the chlorotrifluoroethylene (CTFE), tetrafluoroethylene (TFE), hexafluoropropylene (HFP) and/or ethylene units and optionally VDF and/or VF3 units.

Advantageously, the fluoropolymer is polyvinylidene fluoride (PVDF) homopolymer or copolymer. Preferably, the PVDF contains at least 50%, more preferably at least 75% and even better at least 85% VDF by weight. The comonomer is advantageously HFP.

Advantageously, the PVDF has a viscosity ranging from 100 Pa.s to 2000 Pa.s, the viscosity being measured at 230° C. with a shear rate of 100 s$^{-1}$ using a capillary rheometer. These PVDFs are in fact well suited to extrusion and injection moulding. Preferably, the PVDF has a viscosity ranging from 300 Pa.s to 1200 Pa.s, the viscosity being measured at 230° C. with a shear rate of 100 s$^{-1}$ using a capillary rheometer.

Thus, PVDFs sold under the brand KYNAR® 710 or 720 are perfectly suitable for this formulation.

As example of the unsaturated grafting monomer, mention may be made of carboxylic acids and their derivatives, acid chlorides, isocyanates, oxazolines, epoxides, amines and hydroxides.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids. Mention may also be made of undecylenic acid.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methyl-bicyclo[2.2.1]hept-5-ene-2,2-dicarboxylic anhydrides.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Advantageously, maleic anhydride is used.

Step a) is carried out in any mixing device, such as extruders or mixers used in the thermoplastics industry.

Regarding the proportions of the fluoropolymer and the unsaturated monomer, the proportion of fluoropolymer is advantageously, by weight, from 90 to 99.9% for 0.1 to 10% of unsaturated monomer, respectively. Preferably, the proportion of fluoropolymer is from 95 to 99.9% for 0.1 to 5% of unsaturated monomer, respectively.

After step a) it is observed that the fluoropolymer/unsaturated monomer blend has lost about 10 to 50% of the unsaturated monomer that had been introduced at the start of step a). This proportion depends on the volatility and the nature of the unsaturated monomer. In fact, the monomer is vented in the extruder or the mixer and is recovered in the venting circuits.

With regard to step c), the products recovered after step b) are advantageously packaged in polyethylene bags, the air is expelled and then the bags are closed. As regards the method of irradiation, it is equally possible to use electron irradiation, more commonly known as beta irradiation, and photon irradiation, more commonly known as gamma irradiation. Advantageously, the dose is between 2 and 6 Mrad and preferably between 3 and 5 Mrad. With regard to step d), the ungrafted monomer may be removed by any means. The proportion of grafted monomer with respect to the monomer present at the start of step c) is between 50 and 100%. A washing operation with solvents inert with respect to the fluoropolymer and to the grafted functional groups may be carried out. For example, when maleic anhydride is used for the grafting, chlorobenzene may be used for the washing. It is also possible, more simply, to vacuum degas the product recovered in step c).

The invention also relates to structures. As examples of structures according to the invention, mention may be made of that comprising, in succession:

an inner layer in contact with the fluid to be transported or stored, consisting of the fluoropolymer grafted according to the invention and, directly attached to the latter, an outer polyolefin layer. This structure is useful for motor-vehicle petrol tanks. According to a variant, this structure includes a layer of fluoropolymer, preferably PVDF, deposited beside the grafted fluoropolymer. That is to say the structure comprises, in succession, a layer of fluoropolymer, preferably PVDF, a layer consisting of the fluoropolymer grafted according to the invention and, directly attached to the latter, an outer polyolefin layer. The layer of grafted fluoropolymer is a tie layer between the PVDF layer and the polyolefin layer.

In the above structures, it is possible to place, between the grafted fluoropolymer layer and the polyolefin layer, a layer of functionalized polyolefin having functional groups capable of reacting with the functional groups grafted onto the fluoropolymer. For example, if maleic anhydride has been grafted onto the fluoropolymer, the functionalized polyolefin layer consists of a copolymer of ethylene with glycidyl methacrylate and optionally with an alkyl acrylate, optionally in a blend with polyethylene.

In the above structures, the inner layer in contact with the fluid to be transported or stored may contain carbon black, carbon nanotubes or any other additive capable of making it conductive in order to prevent static electricity from building up.

As another example of structures according to the invention, mention may be made of that comprising, in succession:

a layer consisting of the fluoropolymer grafted according to the invention, placed between two polyolefin layers.

This structure is useful for motor-vehicle petrol tanks.

In the above structures, it is possible to place, between the grafted fluoropolymer layer and one or both polyolefin layers, a layer of functionalized polyolefin having functional groups capable of reacting with the functional groups grafted onto the fluoropolymer. For example, if maleic anhydride has been grafted onto the fluoropolymer, the layer of functionalized polyolefin consists of a copolymer of ethylene with glycidyl methacrylate and optionally with an alkyl acrylate, optionally in a blend with polyethylene.

As another example of structures according to the invention, mention may be made of that comprising, in succession:

an inner layer in contact with the fluid to be transported or stored, consisting of the fluoropolymer grafted according to the invention and, directly attached to the latter, an outer polyamide layer. This structure is useful for motor-vehicle fuel pipes or hoses. According to a variant, this structure includes a layer of fluoropolymer, preferably PVDF, placed beside the grafted fluoropolymer. That is to say the structure comprises, in succession, a layer of fluoropolymer, preferably PVDF, a layer consisting of the fluoropolymer grafted according to the invention and, directly attached to the latter, an outer polyamide layer. The layer of grafted fluoropolymer is a tie layer between the PVDF layer and the polyamide layer.

In the above structures, it is possible to place, between the grafted fluoropolymer layer and the polyamide layer, a layer of functionalized polymer having functional groups capable of reacting with the functional groups grafted onto the fluoropolymer, this functionalized polymer being compatible with the polyamide.

In the above structures, the inner layer in contact with the fluid to be transported or stored may contain carbon black, carbon nanotubes or any other additive capable of making it conductive in order to prevent static electricity from building up.

As another example of structures according to the invention, mention may be made of that comprising, in succession:

an outer layer of grafted fluoropolymer of the invention and, directly attached to the latter, a layer of a substrate. The grafted fluoropolymer layer is used as a layer for protecting the substrate. The substrate may be a component of the body of a motor vehicle or an architectural component. According to a variant, this structure includes a layer of fluoropolymer, preferably PVDF, placed beside the grafted fluoropolymer. That is to say the structure comprises, in succession, a layer of fluoropolymer, preferably PVDF, a layer consisting of the fluoropolymer grafted according to the invention and, directly attached to the latter, a layer of a substrate. The layer of grafted fluoropolymer is a tie layer between the PVDF layer and the substrate layer.

In the above structures, it is possible to place, between the grafted fluoropolymer layer and the substrate layer, a layer of functionalized polymer having functional groups capable of reacting with the functional groups grafted onto the fluoropolymer, this polymer being compatible with the substrate.

The grafted fluoropolymer or PVDF used as layer for protecting a substrate may contain the usual UV stabilizers and/or radiation-absorbent fillers.

These structures may be manufactured by standard techniques, such as extrusion, coextrusion, coextrusion blow moulding, coating, extrusion coating.

The invention also relates to the bulk-grafted fluoropolymer.

EXAMPLES

The following fluoropolymer was used:
Kynar® 720: A PVDF homopolymer from Atofina, having an MVI (melt volume index) of 10 cm$^3$/10 min (230° C./5 kg).

Example 1: (According to the Invention)

A blend of Kynar 720 PVDF from Atofina and 2% by weight of maleic anhydride was prepared. This blend was prepared using a twin-screw extruder at 230° C. and 150 rpm with an output of 10 kg/h. After the extrusion step, 1.8% of maleic anhydride remained in the product, the rest being lost during the extrusion step. The product thus prepared was put into sealed aluminium bags. These bags were then irradiated to 3 Mrad. A 40% degree of grafting was determined—this was checked after a dissolution/precipitation step. The MAg-PVDF product (maleic-anhydride-grafted PVDF) was then placed under vacuum overnight at 130° C. in order to remove the residual maleic anhydride and the hydrofluoric acid liberated during irradiation.

A three-layer structure was produced by the compression moulding, at 220° C. under 1 bar, of an MA-g-PVDF layer A (thickness: 500 μm) bonded to a layer B of a blend of (i) 50% by weight of Lotader® 8840 (thickness: 100 μm), which is an ethylene/glycidyl methacrylate copolymer of 5 g/10 min MFI at 190° C./2.16 kg (containing 92% ethylene and 8% glycidyl methacrylate by weight), and (ii) 50% of Stamylex® 1016 F polyethylene (an LLDPE of 1.1 g/10 min MFI at 190° C./2.16 kg) which was itself bonded to a layer C consisting of MS201N High-density PE (0.950 density; 8 g/10 min MFI at 190° C./2.16 kg) (thickness: 500 μm).

At t=0, an adhesive strength of 30 N/cm was measured at the A/B interface, and the B/C interface could not be peeled. The structure was immersed in M15 fuel at 60° C. After 15 days, the structure showed no delamination and a force of 15 N/cm was measured at the A/B interface. After the A/B/C structure was vacuum-dried for one week at 60° C., the peel force between A and B was again measured, namely 30 N/cm.

Example 2: (Comparative Example)

A blend of Kynar 720 PVDF from Atofina and 2% by weight of maleic anhydride was prepared. This blend was prepared using a twin-screw extruder at 230° C. and 150 rpm with an output of 10 kg/h. After the extrusion step, 1.8% of maleic anhydride remained in the product, the rest being lost during the extrusion step. The product thus prepared was put into aluminium sealed bags.

A three-layer structure was produced by the compression moulding, at 220° C. under 1 bar, of an MA+PVDF layer A (thickness: 500 μm) bonded to a layer B of a blend of (i) 50% by weight of Lotader® 8840 (thickness: 100 μm) which is an ethylene/glycidyl methacrylate copolymer of 5 g/10 min MFI at 190° C./2.16 kg (92% ethylene and 8% glycidyl methacrylate by weight), and (ii) 50% of Stamylex® 1016 F polyethylene, which was itself bonded to a layer C consisting of MS201N High-density PE (thickness: 500 μm).

At t=0, an adhesive strength of 1 N/cm was measured at the A/B interface and the B/C interface could not be peeled. The structure was immersed in M15 fuel at 60° C. After 15 days, the structure exhibited delamination at the A/B interface.

Example 3: (According to the Invention)

A blend of Kynar 720 PVDF from Atofina and 0.5% by weight of maleic anhydride was prepared. This blend was prepared using a twin-screw extruder at 230° C. and 150 rpm with an output of 10 kg/h. After the extrusion step, 0.45% of maleic anhydride remained in the product, the rest being lost during the extrusion step. The product thus prepared was put into sealed aluminium bags. These bags were then irradiated to 3 Mrad. A 50% degree of grafting was determined—this was checked after a dissolution/precipitation step. The MA-g-PVDF product was then placed under vacuum overnight at 130° C. in order to remove the residual maleic anhydride and the hydrofluoric acid liberated during irradiation.

A three-layer structure was produced by the compression moulding, at 220° C. under 1 bar, of an MA-g-PVDF layer A (thickness: 500 μm) bonded to a layer B of a blend of (i) 50% by weight of Lotader® 8840 (thickness: 100 μm), which is an ethylene/glycidyl methacrylate copolymer of 5 g/10 min MFI at 190° C./2.16 kg (containing 92% ethylene and 8% glycidyl methacrylate by weight), and (ii) 50% of Stamylex® 1016 F polyethylene which was itself bonded to a layer C consisting of MS201N High-density PE (thickness: 500 μm).

At t=0, an adhesive strength of 25 N/cm was measured at the A/B interface, and the B/C interface could not be peeled. The structure was immersed in M15 fuel at 60° C. After 15 days, the structure showed no delamination and a force of 14 N/cm was measured at the A/B interface. After the A/B/C structure was vacuum-dried for one week at 60° C., the peel force between A and B was again measured, namely 25 N/cm.

Example 4: (According to the Invention)

A blend of Kynar 720 PVDF from Atofina and 2% by weight of maleic anhydride was prepared. This blend was prepared using a twin-screw extruder at 230° C. and 150 rpm with an output of 10 kg/h. After the extrusion step, 1.8% of maleic anhydride remained in the product, the rest being lost during the extrusion step. The product thus prepared was put into sealed aluminium bags. These bags were then irradiated to 3 Mrad. A 40% degree of grafting was determined—this was checked after a dissolution/precipitation step. The MA-g-PVDF polymer was then extruded under vacuum in order to allow devolatilization of the ungrafted species.

A three-layer structure was produced by the compression moulding, at 220° C. under 1 bar, of an MA-g-PVDF layer A (thickness: 500 μm) bonded to a layer B of a blend of (i) 50% by weight of Lotadere 8840 (thickness: 100 μm), which is an ethylene/glycidyl methacrylate copolymer of 5 g/10 min MFI at 190° C./2.16 kg (containing 92% ethylene and 8% glycidyl methacrylate by weight), and (ii) 50% of Stamylex® 1016 F polyethylene which was itself bonded to a layer C consisting of MS201N High-density PE (thickness: 500 μm).

At t=0, an adhesive strength of 30 N/cm was measured at the A/B interface, and the B/C interface could not be peeled. The structure was immersed in M15 fuel at 60° C. After 15 days, the structure showed no delamination and a force of 15 N/cm was measured at the A/B interface. After the A/B/C structure was vacuum-dried for one week at 60° C., the peel force between A and B was again measured, namely 30 N/cm.

Example 5: (Comparative Example)

A powder blend, consisting of Kynar 720 PVDF (2000 g) with maleic anhydride (20 g) was prepared. The blending was carried out in a turbolator for 10 minutes. The blend was put into a sealed bag. The bag was sealed, taking care to expel as much air as possible from the bag. The sealing of the bag was checked, as neither air nor dust must be able to escape from the bag. The latter underwent beta irradiation to 6 Mrad (10 MeV beta). The powder, infrared-analysed after heating in an oven overnight at 130° C., had a degree of grafting below the detection limit <0.05%. The maleic anhydride had not grafted onto the outermost surface of the PVDF powder.

Example 6: (According to the Invention)

A blend of Kynar 720 PVDF from Atofina and 0.5% by weight of maleic anhydride was prepared. This blend was prepared using a twin-screw extruder at 230° C. and 150 rpm with an output of 10 kg/h. After the extrusion step, 0.45% of maleic anhydride remained in the product, the rest being lost during the extrusion step. The product thus prepared was put into sealed aluminium bags. These bags were then irradiated to 3 Mrad. A 50% degree of grafting was determined—this was checked after a dissolution/precipitation step. The MAg-PVDF product was then placed under vacuum overnight at 130° C. in order to remove the residual maleic anhydride and the hydrofluoric acid liberated during irradiation.

A five-layer structure was reduced by the compression moulding, at 220° C. under 1 bar, of a C/B/A/B/C structure, with the layer A consisting of MA-g-PVDF (thickness: 200 μm), the layer B consisting of a blend of (i) 50% by weight of Lotader® 8840 (thickness: 100 μm) which is an ethylene/glycidyl methacrylate copolymer of 5 g/10 min MFI at 190° C./2.16 kg (92% ethylene and 8% glycidyl methacrylate by weight), and (ii) 50% of Stamylexo 1016 F polyethylene and the layer C consisting of MS201N high-density PE (1000 μm).

At t=0, an adhesive strength of 70 N/cm was measured at the A/B interface, and the B/C interface could not be peeled. The structure was immersed in M15 fuel at 60° C. After 22 days, the structure showed no delamination and a force of 20 N/cm was measured at the A/B interface. After the C/B/A/B/C structure was vacuum-dried for one week at 60° C., the peel force between A and B was again measured, namely 70 N/cm.

Example 7: (According to the Invention)

A blend of Kynar 720 PVDF from Atofina and 2% by weight of maleic anhydride was prepared. This blend was prepared using a twin-screw extruder at 230° C. and 150 rpm with an output of 10 kg/h. After the extrusion step, 1.8% of maleic anhydride remained in the product, the rest being lost during the extrusion step. The product thus prepared was put into sealed aluminium bags. These bags were then irradiated to 3 Mrad. A 40% degree of grafting was determined—this was checked after a dissolution/precipitation step. The MA-g-PVDF product was then extruded under vacuum in order to allow devolatilization of the ungrafted species.

A three-layer structure was then coextruded, this consisting of an MA-g-PVDF layer A (thickness: 150 μm) bonded to a layer B of a blend of (i) 50% by weight of Lotader® 8840 (thickness: 50 μm), which is an ethylene/glycidyl methacrylate copolymer of 5 g/10 min MFI at 190° C./2.16 kg (92% ethylene and 8% glycidyl methacrylate by weight), and (ii) 50% of Stamylex® 1016 F polyethylene, which was itself bonded to a layer C consisting of 2040 ML55 high-density PE (thickness: 800 μm).

At t=0, an adhesive strength of 30 N/cm was measured at the A/B interface, and the B/C interface could not be peeled. The structure was immersed in M15 fuel at 60° C. After 15 days, the structure showed no delamination and a force of 15 N/cm was measured at the A/B interface. After the A/B/C structure was vacuum-dried for one week at 60° C., the peel force between A and B was again measured, namely 30 N/cm.

The invention claimed is:

1. Process for grafting an unsaturated monomer onto a fluoropolymer, comprising the steps of:
   a) melt blending the fluoropolymer with the unsaturated monomer;
   b) forming the blend obtained in a) into films, sheets, granules or powder;
   c) exposing the products from step b), in the absence of air, to photon (γ) or electron (β) irradiation with a dose of between 1 and 15 Mrad; and
   d) optionally treating the product obtained at c) in order to remove all or part of the unsaturated monomer that has not been grafted onto the fluoropolymer.

2. Process according to claim 1, in which the fluoropolymer is PVDF.

3. Process according to claim 2, in which the PVDF contains at least 85% VDF by weight.

4. Process according to claim 1, in which the unsaturated monomer is maleic anhydride.

5. Process according to claim 1, in which the proportion of fluoropolymer is, by weight, from 90 to 99.9% for 0.1 to 10% of unsaturated monomer, respectively.

6. Process according to claim 5, in which the proportion of fluoropolymer is from 95 to 99.9% for 0.1 to 5% of unsaturated monomer, respectively.

7. Process according to claim 1, in which the irradiation dose is between 2 and 6 Mrad.

8. Structure comprising at least one layer of grafted fluoropolymer and at least one layer of another material, wherein said grafted fluoropolymer is prepared by a process comprising the steps of:
   a) melt blending the fluoropolymer with the unsaturated monomer;
   b) forming the blend obtained in a) into films, sheets, granules or powder;
   c) exposing the products from step b), in the absence of air, to photon (γ) or electron (β) irradiation with a dose of between 1 and 15 Mrad; and
   d) optionally treating the product obtained at c) in order to remove all or part of the unsaturated monomer that has not been grafted onto the fluoropolymer.

9. Structure according to claim 8 comprising bottles, tanks, containers, pipes, hoses, vessels, films and packaging.

10. Structure according to claim 8 wherein the inner layer is in contact with a fluid to be transported or stored, and said inner layer consists of the grafted fluoropolymer directly attached to an outer polyolefin layer.

11. Structure according to claim 10, in which a PVDF layer is deposited beside the grafted fluoropolymer layer.

12. Structure according to claim 10, in which a layer of functionalized polymer having functional groups capable of reacting with the functional groups grafted onto the fluoropolymer is placed between the grafted fluoropolymer layer and the polyolefin layer.

13. Structure according to claim 8 comprising a layer consisting of the grafted fluoropolymer manufactured, placed between two polyolefin layers.

14. Structure according to claim 13, in which a layer of functionalized polyolefin having functional groups capable of reacting with the functional groups grafted onto the fluoropolymer is placed between the grafted fluoropolymer layer and one or both polyolefin layers.

15. Structure according to claim 8 wherein the inner layer is in contact with a fluid to be transported or stored, and said inner layer consists of the grafted fluoropolymer directly attached to an outer polyamide layer.

16. Structure according to claim 15, in which a PVDF layer is placed beside the grafted fluoropolymer layer.

17. Structure according to claim 15, in which a layer of functionalized polymer having functional groups capable of reacting with the functional groups grafted onto the fluoropolymer is placed between the grafted fluoropolymer layer and the polyamide layer, this functionalized polymer being compatible with the polyamide.

18. Structure according to claim 15, in which the inner layer in contact with the fluid to be transported or stored may contain carbon black, carbon nanotubes or any other additive capable of making it conductive in order to prevent static electricity from building up.

19. Structure according to claim 8 comprising an outer layer consisting of the grafted fluoropolymer and, directly attached to the latter, a layer of a substrate.

20. Structure according to claim 19, in which a PVDF layer is placed beside the grafted fluoropolymer layer.

21. Structure according to claim 19, in which a layer of functionalized polymer having functional groups capable of reacting with the functional groups grafted onto the fluoropolymer is placed between the grafted fluoropolymer layer and the substrate layer, this functionalized polymer being compatible with the substrate.

* * * * *